(12) United States Patent
Schultz

(10) Patent No.: US 8,561,502 B2
(45) Date of Patent: Oct. 22, 2013

(54) DUAL DRIVE PUMP SYSTEM WITH ONE WAY CLUTCHES

(75) Inventor: John C. Schultz, Saline, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 195 days.

(21) Appl. No.: 13/267,666

(22) Filed: Oct. 6, 2011

(65) Prior Publication Data

US 2012/0118102 A1    May 17, 2012

Related U.S. Application Data

(60) Provisional application No. 61/414,153, filed on Nov. 16, 2010.

(51) Int. Cl.
*F16H 37/06* (2006.01)
(52) U.S. Cl.
USPC .......................................... 74/661; 74/665 B

(58) Field of Classification Search
USPC ...... 74/655, 661, 665 R, 665 A, 665 B, 730.1
See application file for complete search history.

(56) References Cited

U.S. PATENT DOCUMENTS

| | | | | |
|---|---|---|---|---|
| 5,121,821 A | * | 6/1992 | Poorman et al. | 192/3.28 |
| 5,285,111 A | * | 2/1994 | Sherman | 290/4 C |
| 5,398,562 A | * | 3/1995 | Muchmore | 74/6 |
| 8,113,089 B2 | * | 2/2012 | Maguire | 74/730.1 |

\* cited by examiner

Primary Examiner — Ha D Ho

(57) ABSTRACT

A dual drive pump system for rear wheel or front wheel drive automatic transmission in a motor vehicle includes a dual drive pump disposed off-axis of the transmission input shaft axis and driven by a gear train driven by a hub. The dual drive pump is also driven by a gear train driven by an auxiliary motor. Torque multiplication through the gear train allows the dual drive pump to have a smaller displacement while still providing the hydraulic pressure needs of the transmission. Each gear train is connected to the dual drive pump via back-to-back one way clutches (OWC). The dual drive pump may be driven by either an engine or the auxiliary motor depending on the operating conditions of the motor vehicle.

21 Claims, 2 Drawing Sheets

DUAL DRIVE PUMP SYSTEM WITH ONE WAY CLUTCHES

CROSS-REFERENCE

This application claims the benefit of U.S. Provisional Application No. 61/414,153, filed Nov. 16, 2010. The entire contents of the above application are incorporated herein by reference.

FIELD

The present disclosure relates to a dual drive hydraulic pump for an automatic transmission and more particularly to a dual drive transmission pump that is selectively powered by two prime movers through back-to-back one way clutches to allow engine stop-start and hot engine idle starts.

BACKGROUND

The statements in this section merely provide background information related to the present disclosure and may or may not constitute prior art.

Hydraulic motor vehicle transmissions, that is, automatic transmissions for passenger cars and light duty trucks having a plurality of gear assemblies controlled by clutches and brakes, generally include a dedicated hydraulic pump which provides pressurized transmission (hydraulic) fluid to control valves and actuators. These control valves and actuators engage the clutches and brakes and provide the various gear ratios or speeds.

Such dedicated pumps are generally fixed displacement pumps such as vane or gear pumps that are driven at engine speed from the hub of the torque converter or other startup device located between the engine and the transmission. Such pumps have many design goals. Since the pump is constantly driven at engine speed, it is desirable that it have high efficiency. Additionally, since the pump is most frequently mounted concentric to the engine axis, small size, particularly axial length, is desirable in order not to increase the length of the transmission.

In vehicles having engine stop-start where the engine shuts down during stops in order to increase fuel economy, the pump must be operable to prime or position the clutches and/or brakes by keeping the clutch hydraulic circuits filled with low pressure hydraulic fluid. Various solutions have been proposed to allow the pump to prime the hydraulic circuit during an engine stop-start, such as using auxiliary pumps or accumulators. However, typical designs sacrifice packaging, energy consumption, noise pollution, cost and/or complexity to achieve their goals. Accordingly, there is room in the art for a transmission pump system that has efficient packaging while having reduced complexity and energy costs while still providing adequate engine stop-start performance in terms of energy usage and noise.

SUMMARY

In one example according to the principles of the present invention, a dual drive pump system for an automatic transmission is provided. The dual drive pump system includes a dual drive pump driven by a gear train driven by a hub. The dual drive pump is also driven by a gear train driven by an auxiliary motor. Torque multiplication through the gear train allows the dual drive pump to have a smaller displacement while still providing the hydraulic pressure needs of the transmission. Each gear train is connected to the dual drive pump via back-to-back one way clutches (OWC). The dual drive pump may be driven by either an engine or the auxiliary motor depending on the operating conditions of the motor vehicle.

Further aspects, advantages and areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
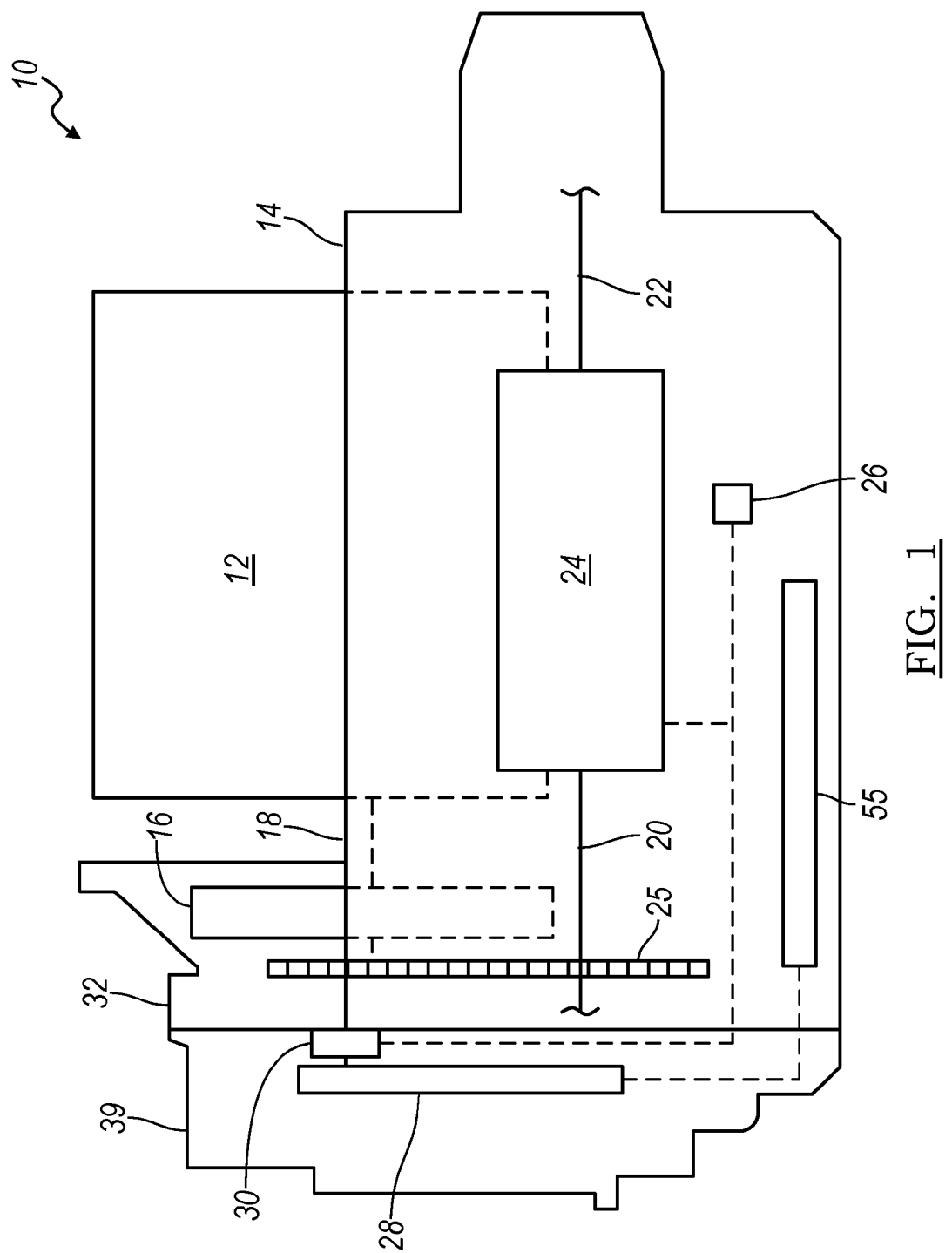
FIG. 1 is a schematic view of an exemplary powertrain of a motor vehicle.

With reference to FIG. 1, an exemplary powertrain for a motor vehicle is generally indicated by reference number 10. At the outset it should be appreciated that the powertrain 10 is illustrated schematically in order to generally indicate some of the components of the powertrain 10. It should be appreciated that the illustration of the powertrain 10 is not intended to be limiting to the configuration shown. The powertrain 10 includes an engine 12 interconnected to a transmission 14. The engine 12 may be a conventional internal combustion engine or an electric engine, or any other type of prime mover, without departing from the scope of the present disclosure. The engine 12 supplies a driving torque to the transmission 14 through a starting device 16. The starting device 16 may be a hydrodynamic device, such as a fluid coupling or torque converter, a wet dual clutch, or an electric motor. It should be appreciated that any starting device between the engine 12 and the transmission 14 may be employed.

The transmission 14 includes a typically cast, metal housing 18 which encloses and protects the various components of the transmission 14. The housing 18 includes a variety of apertures, passageways, shoulders and flanges which position and support these components. Generally speaking, the transmission 14 includes a transmission input shaft 20 and a transmission output shaft 22. Disposed between the transmission input shaft 20 and the transmission output shaft 22 is a gear and clutch arrangement 24. It should be appreciated that while the transmission 14 is illustrated as a front wheel drive transmission, the transmission 14 may be a rear wheel drive transmission without departing from the scope of the present disclosure. The transmission input shaft 20 is functionally interconnected with the engine 12 via a drive chain 25 connected to the starting device 16 and receives input torque or power from the engine 12. The transmission output shaft 22 is preferably connected with a final drive unit (not shown) which may include, for example, propshafts, differential assemblies, and drive axles. The transmission input shaft 20 is coupled to and provides drive torque to the gear and clutch arrangement 24.

The gear and clutch arrangement 24 includes a plurality of gear sets, a plurality of clutches and/or brakes, and a plurality of shafts. The plurality of gear sets may include individual intermeshing gears, such as planetary gear sets, that are connected to or selectively connectable to the plurality of shafts through the selective actuation of the plurality of clutches/brakes. The plurality of shafts may include layshafts or countershafts, sleeve and center shafts, reverse or idle shafts, or combinations thereof. The clutches/brakes are selectively engageable to initiate at least one of a plurality of gear or speed ratios by selectively coupling individual gears within the plurality of gear sets to the plurality of shafts. It should be appreciated that the specific arrangement and number of the gear sets, clutches/brakes, and shafts within the transmission 14 may vary without departing from the scope of the present disclosure.

The transmission 14 also includes a transmission control module 26. The transmission control module 26 is preferably an electronic control device having a preprogrammed digital computer or processor, control logic, memory used to store data, and at least one I/O peripheral. The control logic includes a plurality of logic routines for monitoring, manipulating, and generating data. The transmission control module 26 controls the actuation of the clutches/brakes via a hydraulic control system 28. The hydraulic control system 28 is operable to selectively engage the clutches/brakes by selectively communicating a hydraulic fluid to the clutches/brakes that engages the clutches/brakes. The hydraulic fluid is communicated to the clutches/brakes under pressure from a dual pump system 30 connected to the hydraulic control system 28, as will be described in greater detail below.

Figure 2:
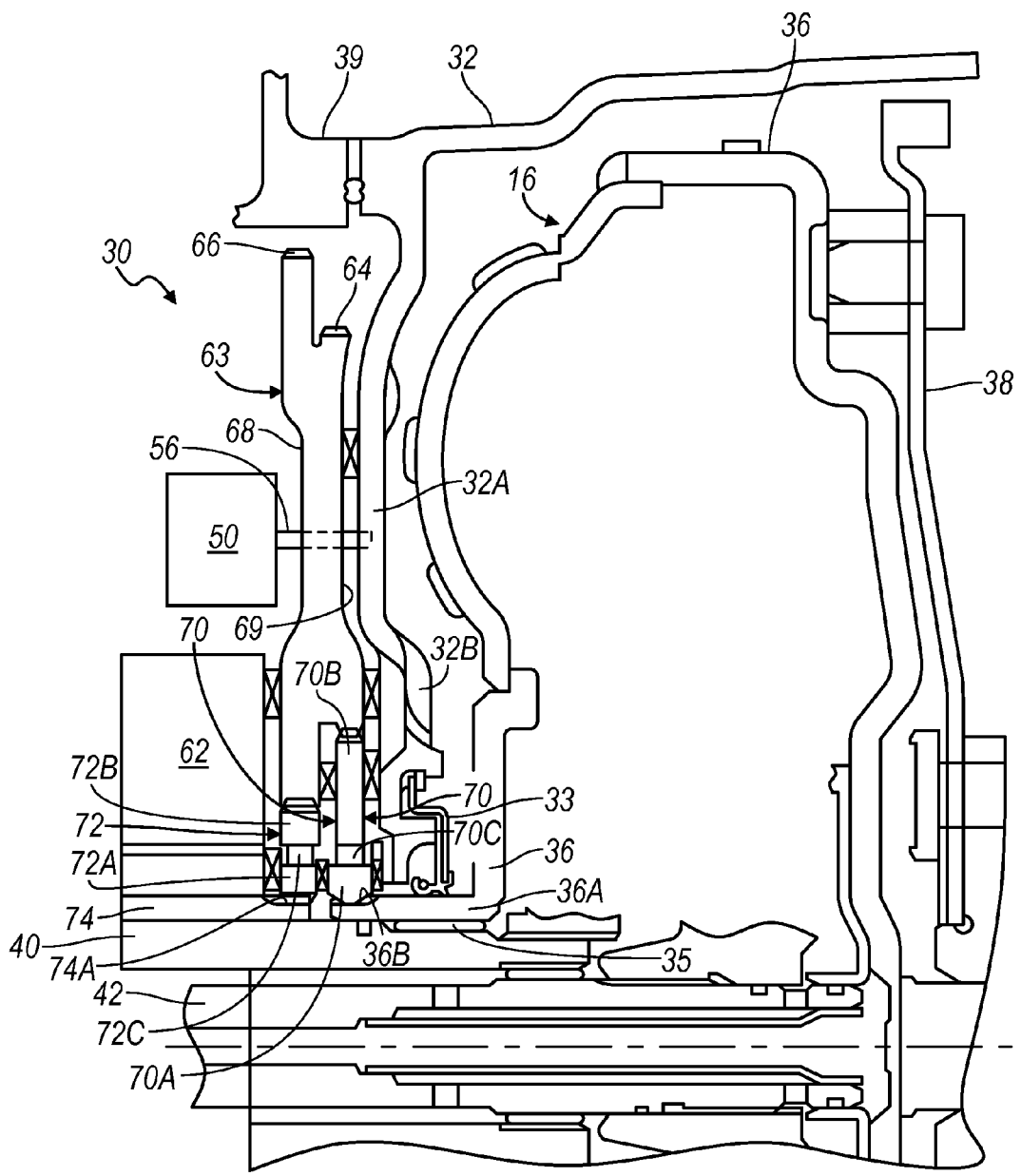
FIG. 2 is a partial cross section view of a portion of the exemplary powertrain shown in FIG. 1.

With combined reference to FIGS. 1 and 2, the starting device 16 is housed within a bell housing 32. The bell housing 32 is generally cast aluminum and includes openings, counterbores, flanges, shoulders and other features which receive, locate and support the various components of the starting device 16 as well as the dual pump system 30. Generally speaking, the starting device 16 includes a hub, shell, or other member 36 that is directly driven by the engine 12 via a flexplate connection 38 or other type of connection. An axial portion 36A of the hub 36 extends through the bell housing 32 and into the transmission housing 18 (in the case of a rear wheel drive transmission) or a side cover 39 (in the case of the front wheel drive transmission illustrated). The hub portion 36A is sealed to the bell housing 32 by a sealing member 33 located radially outward of the hub portion 36A. The hub portion 36A is supported for rotation by a bearing 35 located radially inward of the hub portion 36A and radially aligned with the sealing member 33. The bearing 35 may in turn be supported by a stator shaft 40, a turbine shaft or transmission input shaft 42, or any other member within the transmission 14. The radial alignment of the sealing member 33 and the bearing 35 reduce the axial space of the bell housing 32 relative to the hub 36 of the starting device 16.

The pump system 30 of the transmission 14 includes an off-axis pump 50. The pump 50 is mounted to the bell housing 32 and is located within the side cover 39. The pump includes an inlet (not shown) that communicates with a sump 55 in the transmission 14 and an outlet port (not shown) that communicates with various components in the transmission 14 including the hydraulic control system 28. The pump 50 includes a drive shaft or input shaft 56.

The pump 50 is driven by two prime movers including the engine 12 via the hub 36 and by a second prime mover or auxiliary motor 62. The pump 50 includes a gear assembly 63 having a first and second driven gear 64, 66 rotationally fixedly connected to the pump input shaft 56. In the example provided, the gear assembly 63 is a unitary component with the first and second driven gears 64 and 66 integrated into a single part. However, it should be appreciated that the gear assembly 63 may be separated such that each of the first and second driven gears 64 and 66 may be separate components or parts each fixedly and rotationally coupled to the pump input shaft 56. In addition, the gear assembly 63 includes a first recess or concave portion 68 co-axial with and adjacent the pump 50 in order to reduce the axial dimension of the pump 50 and the gear assembly 63. The gear assembly 63 also includes a second recess or concave portion 69 coaxial with the pump 50 and contoured to accommodate a portion 32A of the bell housing 32 that extends axially towards the side cover 39. The portion 32A is axially sized to accommodate the hub 36 of the starting device 16. Radially inward of the portion 32A, the bell housing 32 includes a portion 32B that extends back axially away from the side cover 39. It should be appreciated that the bell housing 32 is contoured to accommodate the starting device 16, and that the shape of the bell housing 32 may vary depending on the type of starting device 16 employed in the transmission 14.

The first driven gear 64 is in mesh with a first one-way clutch (OWC) 70 and the second driven gear 66 is in mesh with a second one-way clutch (OWC) 72. In the example provided, the first OWC 70 is connected between the hub 36 of the starting device 16 and the first driven gear 64. The first OWC 70 is configured to allow the hub 36 to freewheel in a rotational direction relative to the gear assembly 63 when the auxiliary pump 62 is driving the pump 50. The second OWC 72 is connected between an auxiliary motor output shaft 74 and the second driven gear 66. The motor output shaft 74 is driven by the auxiliary motor 62. The second OWC 72 is configured to allow the motor output shaft 74 to freewheel in a rotational direction relative to the gear assembly 63 when the engine 12 is driving the pump 50. Accordingly the one way clutches 70 and 72 allow whichever of the motor output shaft 74 and the hub 36 is running slower than the other to freewheel, thereby preventing drag on the pump 50.

It should be appreciated that the motor output shaft 74 and the inner race 72A may be combined into a single, unitary piece. Furthermore, the motor output shaft 74 and the inner race 72A may be combined with an armature (not shown) of the motor 62 in order to provide additional axial space in order to accommodate any movement of the hub 36 towards the auxiliary motor 62, such as during ballooning of the starting device 16 that can occur with hydrodynamic starting devices.

For example, the first OWC 70 includes an inner race 70A, a cam or outer race 70B, and one or more elements 70C, such as rollers or sprags, disposed between the inner and outer races 70A and 70B. Likewise, the second OWC 72 includes an inner race 72A, a cam or outer race 72B, and one or more elements 72C, such as rollers, sprags, or diodes, disposed between the inner and outer races 72A and 72B. The inner and outer races 70A, 72A, 70B, and 72B are geared or splined on their inner and outer surfaces, respectively, as is known in the art. Accordingly, the inner race 70A is in mesh with and driven by a gear portion 36B located on the axial portion 36A of the hub 36. The outer race 70B is in mesh with and drives the first driven gear 64. The inner race 72A is in mesh with and driven by a gear portion 74A of the pump output shaft 74. The outer race 72B is in mesh with and drives the second driven gear 66. The gears 64, 66, gear portions 36B, 74A, and the inner and outer races 70A, 72A, 70B, and 72B are, in one example, involute spline gears which are tolerant of misalignment. This is especially helpful in rear wheel drive transmissions during bending of the transmission 14 during turning of the motor vehicle. However, it should be appreciated that other types of gears may be employed without departing from the scope of the present invention. The gears 64, 66, gear portions 36B, 74A, and the inner and outer races 70A, 72A, 70B, and 72B may be made from any suitable material, such as powdered metal or plastic, without departing from the scope of the present invention.

In the example provided, the outer race 70B has a larger diameter than the outer race 72B, though it should be appreciated that the race diameters may change without departing from the scope of the present invention. For example, the diameter and tooth count of each of the gears 64, 66, gear portions 36B, 74A, and the inner and outer races 70A, 72A, 70B, and 72B may vary and is a function of the type pump 50 and auxiliary motor 62 employed, as well as other factors relating to the hydraulic needs of the transmission 14. For example, in one embodiment, the pump 50 is a 7 cc to 10 cc positive displacement pump, such as a vane pump, gear pump or gerotor pump. The auxiliary motor 62 is preferably a small, high speed electric motor. Therefore, the gear train is configured through gear diameter and tooth count to multiply torque from the auxiliary motor 62 to the pump 50 at about 4:1 or 5:1. To improve slow speed operation and priming, the outer race 70B may have a diameter larger than the diameter of the first driven gear 64, thereby increasing the relative rotational speed of the pump 50. As those familiar with gear train assemblies will readily understand, if it is desired that the hydraulic pump 50 rotate more slowly than the hub 36, the larger and smaller diameter drive members need only be switched.

The first and second one-way clutches 70 and 72 are positioned coaxially adjacent one another in a back-to-back position. The auxiliary motor 62 is positioned adjacent and coaxial to the second OWC 72 and the bell housing 32 is positioned adjacent the first OWC 70. The positioning of the first and second one-way clutches 70 and 72 takes advantage of the reduced axial space of the starter device 16 and the portion 32B of the bell housing near the centerline of the starter device 16.

With combined reference to FIGS. 1 and 2, during normal operation of the powertrain 10, the pump 50 may be operated as a single drive pump wherein only one of the prime movers is powering the pump 50 at a given time, or as a dual drive pump wherein one prime mover is used to augment the other prime mover during certain operating conditions. For example, during normal operating conditions with the engine 12 operating at approximately 1000 RPM (a highway duty cycle), the engine 12 drives the pump 50 through the hub 36 of the starting device 16, through the first OWC 70 to the first driven gear 64, and from the first driven gear 64 to the drive shaft 56. However, during conditions where the engine 12 is operating at a lower duty cycle, such as at 500 RPM during a hot, idle garage shift, the auxiliary pump 62 is used to power the pump 50 through the second OWC 72 to the second driven gear 66 and then to the drive shaft 56. The pump 50 sized for mechanical drive from the engine at 1000 RPM at normal operating temperature could be half the displacement of a pump sized for mechanical drive from the engine for a hot idle garage shift at 500 rpm. Accordingly, the pump 50 may be reduced in size, therefore increasing fuel economy.

During operation of the powertrain 10, the motor vehicle will occasionally enter engine stop-start conditions. Engine stop-start occurs when the motor vehicle has temporarily stopped during operation, such as at a traffic light, stop sign, or due to traffic or other temporary conditions. During an engine stop-start, the engine 12 shuts down to increase fuel economy. However, it is important that the clutches/brakes within the transmission 14 remain primed (i.e. hydraulically actuated to an engaged position) with low pressure hydraulic fluid in order to allow swift and noiseless gear engagement when the engine 12 starts. Accordingly, during a stop-start, when the engine 12 is off, the auxiliary motor 62 is engaged at a low duty cycle to drive the pump 50 in order to keep the clutch circuits filled. As the engine 12 starts during vehicle take-off, the auxiliary motor 62 ramps up to a higher duty cycle (e.g. 4000 RPM) in order to fully engage the appropriate clutches/brakes. The engine 12 restart masks the noise of the auxiliary motor 62. Once the engine 12 has reached a normal duty cycle, the auxiliary motor 62 is disengaged and the engine 12 continues to drive the pump 50.

The construction and configuration of the hydraulic pump 50 provides high pumping efficiency. Such efficiency is the result of several aspects of the pump 50 of the present invention. First of all, in its preferred configuration and disposition, it is mounted off-axis in a transmission. The overall smaller pump diameter and component size of an off-axis pump reduces rotational and sliding friction, reduces rotating internal leakage and permits tighter tolerances, all factors which improve operating efficiency. In addition, an off-axis design facilitates other drive arrangements such as by a dedicated electric motor which has the additional capability of driving the pump when the engine is not running in, for example, engine start-stop (ESS) applications.

The off-axis design of the pump-system 30 allows a rotational speed increase or decrease relative to the rotational speed of the engine 12 and the auxiliary motor 62. This is useful because the typical limiting (minimum) pump flow occurs at low RPM, such as engine idle speed, and it may be desirable to increase this speed such that pump flow is greater at low engine speeds.

The description of the invention is merely exemplary in nature and variations that do not depart from the gist of the invention are intended to be within the scope of the invention. Such variations are not to be regarded as a departure from the spirit and scope of the invention.

The following is claimed:

1. A system for a transmission in a vehicle, the system comprising:
   a starting device;
   a first drive member connected with and rotated by the starting device;
   a prime mover;
   a second drive member connected with and rotated by the prime mover;
   a first one-way clutch directly coupled with the first drive member;
   a second one-way clutch directly coupled with the second drive member;
   a gear assembly having a first driven gear directly coupled with the first one-way clutch and a second driven gear directly coupled with the second one-way clutch, the first driven gear and the second driven gear having an axis of rotation that is parallel with and radially spaced apart from the first drive member and the second drive member;
   a hydraulic pump having a rotor operatively connected to the first driven gear and the second driven gear, wherein the rotor is selectively engaged with each of the first drive member and the second drive member through the first and second one-way clutches for transferring torque between the rotor and at least one of the starting device and the prime mover.

2. The system of claim 1 wherein the second drive member is coaxial with the first drive member, and wherein the rotor of the pump is coaxial with the gear assembly.

3. The system of claim 1 further comprising a bearing in contact with both the first one-way clutch and the second one-way clutch.

4. The system of claim 1 wherein the first driven gear and the second driven gear are formed as a single, solid member.

5. The system of claim 1 wherein the gear assembly includes a first recessed portion in radial alignment with the hydraulic pump.

6. The system of claim 1 wherein the gear assembly includes a second recessed portion having a contour that approximately matches an outer shape of the starting device.

7. The system of claim 1 wherein the first one-way clutch is connected between the first drive member and the first driven gear for allowing free relative rotation between the rotor of the pump and the starting device when the prime mover is driving the rotor and for transferring torque from the starting device to the rotor when the starting device is driving the rotor.

8. The system of claim 1 wherein the second one-way clutch is connected between the second drive member and the second driven gear for allowing free relative rotation between the rotor of the pump and the prime mover when the starting device is driving the rotor and for transferring torque from the prime mover to the rotor when the prime mover is driving the rotor.

9. The system of claim 1 wherein the prime mover is an electric motor.

10. The system of claim 1 further comprising a housing enclosing the starting device, and wherein the first drive member is disposed axially through the housing.

11. The system of claim 1 wherein the prime mover, the hydraulic pump, the first and second one-way clutches, and the gear assembly are disposed within one of a side cover of the transmission or a transmission case of the transmission.

12. The system of claim 1 further comprising an output member connected to the starting device, wherein the output member is connected to and drives the transmission.

13. The system of claim 1 wherein the first driven gear and the second driven gear rotate about an output shaft connected to the rotor.

14. A powertrain for a vehicle, the powertrain comprising:
an engine;
a starting device having an input driven by the engine and having an output driven by the input;
a transmission drivingly connected to the output of the starting device;
an electric motor;
a first drive member connected with and selectively rotated by the input of the starting device;
a second drive member connected with and selectively rotated by the electric motor;
a first one-way clutch intermeshed with the first drive member;
a second one-way clutch intermeshed with the second drive member;
a gear assembly having a first driven gear intermeshed with the first one-way clutch and a second driven gear intermeshed with the second one-way clutch, the gear assembly having an axis of rotation that is parallel with and radially spaced apart from the first drive member and the second drive member;
a hydraulic pump having a rotor connected to the gear assembly, wherein the rotor is selectively engaged with each of the first drive member and the second drive member through the first and second one-way clutches for transferring torque between the rotor and at least one of the engine and the electric motor.

15. The powertrain of claim 14 wherein the second drive member is coaxial with the first drive member, and wherein the rotor of the pump is coaxial with the gear assembly.

16. The powertrain of claim 14 further comprising a bearing in contact with both the first one-way clutch and the second one-way clutch.

17. The powertrain of claim 14 wherein the first one-way clutch is connected between the first drive member and the first driven gear for allowing free relative rotation between the rotor of the pump and the engine when the electric motor is driving the rotor and for transferring torque from the engine to the rotor when the engine is driving the rotor.

18. The system of claim 17 wherein the second one-way clutch is connected between the second drive member and the second driven gear for allowing free relative rotation between the rotor of the pump and the electric motor when the engine is driving the rotor and for transferring torque from the electric motor to the rotor when the engine is driving the rotor.

19. The powertrain of claim 14 further comprising a housing enclosing the starting device and connected to the transmission, the housing having a side wall that extends radially inwardly, and wherein the first drive member is disposed axially through the side wall of the housing.

20. The powertrain of claim 19 wherein the transmission is a front-wheel drive transmission and the prime mover, the hydraulic pump, the first and second one-way clutches, and the gear assembly are disposed within a side cover connected to the housing of the starting device.

21. The system of claim 19 wherein the transmission is a rear-wheel drive transmission and the prime mover, the hydraulic pump, the first and second one-way clutches, and the gear assembly are disposed within the transmission.

* * * * *